July 31, 1956 — W. H. CRAWFORD — 2,756,843
CHECK STAND
Filed April 13, 1953 — 2 Sheets-Sheet 1

INVENTOR:
WAYLAND H. CRAWFORD.
BY
ATTORNEY.

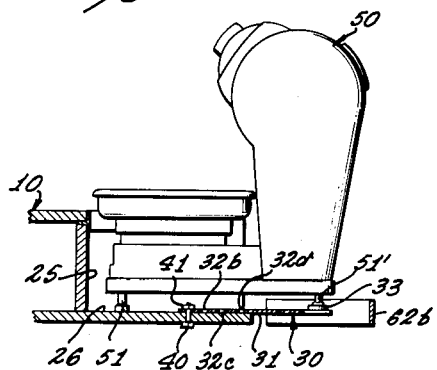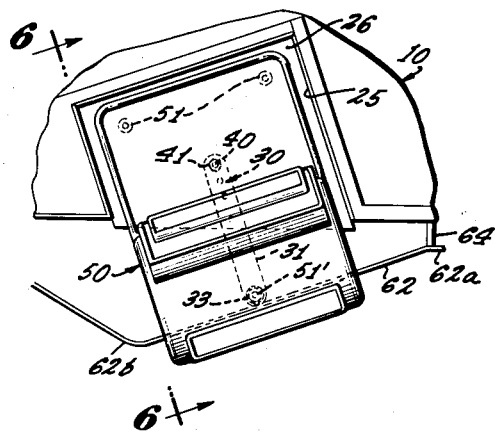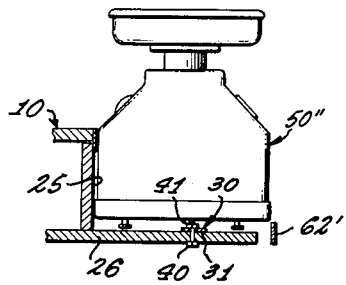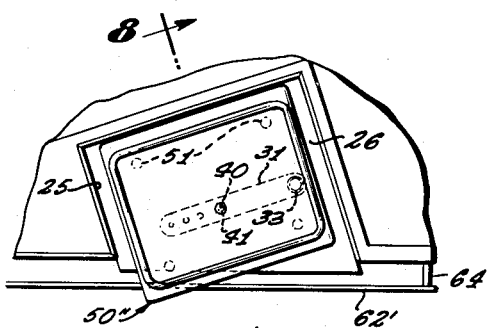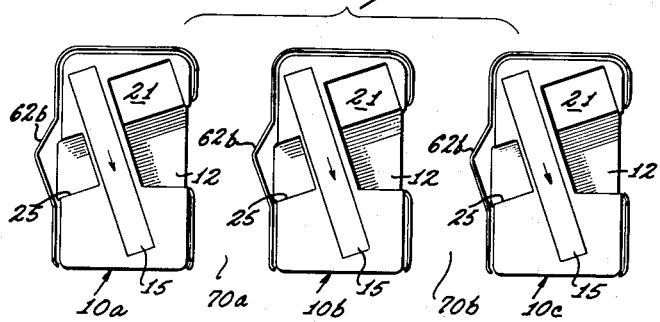

United States Patent Office 2,756,843
Patented July 31, 1956

2,756,843

CHECK STAND

Wayland H. Crawford, San Gabriel, Calif., assignor to Modern Village Stores, Inc., a corporation of California Application April 13, 1953, Serial No. 348,495

3 Claims. (Cl. 186—1)

My invention relates to improvements in check stands that are employed for checking out customers in retail stores, such as grocery stores.

In many grocery stores now in use, customers select their groceries and then cart them in suitable carriages to a checking out point where a checker, or cashier, checks the items purchased and determines the total sale price to be paid by the customer. This method of merchandising has also been extended to other retail stores, such as drug stores, hardware stores, gardening and feed stores, and the like. Where competition is high, as it generally is in most communities, it is highly desirable to perform the checking out operation rapidly, accurately, and with a minimum expense.

In my patent application, Serial No. 244,525, now Patent No. 2,723,728, there is disclosed a checking stand designed to facilitate checking the items purchased in the store. In such a check stand, a conveyor belt is employed and the customer unloads the items on a loading platform at the loading position and places them on the conveyor belt means which leads them to a checking position where items are checked by the checker or cashier. The items are then conveyed by the conveyor belt means to a stacking platform where the stacker places the items in suitable bags, boxes, or other containers.

It is customary in such check stands to provide a computing cash register by which the checker tallies the prices of the purchased items. A weighing scale is also mounted on the check stand by which the checker may weight various items, such as vegetables, fruits, and other bulk articles.

The present invention is concerned with a mounting device by which the scale is mounted on the check stand and guards for protecting such check stands and the scales used thereon.

Scales used for weighing groceries and other items in stores are manufactured in a large variety of sizes and capacities. It is, however, essential that the check stand be made as small as is practically feasible so as to enable a maximum number of the stands to be installed in a limited space while still providing satisfactory passages therebetween. It has heretofore been thought necessary to mount the scale wholly within the confines of the check stand, that is, to support the scale entirely by the check stand structure. Such mounting of the scale has required a check stand of excessive width.

An object of the invention is to provide a simple, inexpensive and highly practical means for supporting the scale in a position to be readily accessible to the checker working within the confines of the check stand.

Another object of this invention is to provide means by which a portion of the scale is supported directly by the check stand structure while the remaining portion of the scale is supported at a point disposed laterally outside the confines of the check stand structure.

Another object is to provide a mounting means which consists of a shelf-like bracket or outrigger support element having an inner end secured to the base or floor of a recessed portion of the check stand structure in which the scale is disposed, and an outer end projecting laterally outwardly from the base to support the outer overhanging portion of the scale, the support element having a socket at its outer extremity for receiving a foot depending from the outer overhanging end of the scale so as to prevent lateral shifting of the scale.

Another object of the invention is to provide a mounting device which is adjustably connected to the check stand so as to adapt it to project at required distances from the check stand to support scales of various sizes. This object is best attained by providing the supporting element with a series of longitudinally-spaced holes through any of which a securing bolt on the check stand may be caused to extend. Thus, by this provision the outer socket end of the element may be readily located at any one of different distances laterally of the side of the check stand to receive the outer supporting and leveling foot of one scale selected from various makes and sizes.

A further object is to provide a scale mounting device which is strong and durable in use, which is inexpensive to produce and install, which is efficient in performing its intended function, and which makes it possible to support scales of various sizes on check stands without altering the structure of the latter.

A further object is to provide a check stand having a projecting scale with a guard rail which protects the scale and vulnerable parts of the check stand from being struck by a customer or his cart.

Further objects will appear from the following description, and from the accompanying drawings which are intended for the purpose of illustration only, and in which:

Fig. 5 is a view similar to Fig. 3, showing the present supporting bracket adjusted outwardly to adapt it to support a large scale;

Fig. 6 is a side elevational view, as observed in the direction of arrows 6 in Fig. 5;

Fig. 7 is another view similar to Fig. 3, showing the supporting bracket retracted, as when a small scale is being supported solely by the recessed base of the check stand;

Fig. 8 is a side elevational view as indicated by the arrows 8 in Fig. 7; and

Fig. 9 is a plan view of a series of chek stands arranged in a store.

Figure 1:
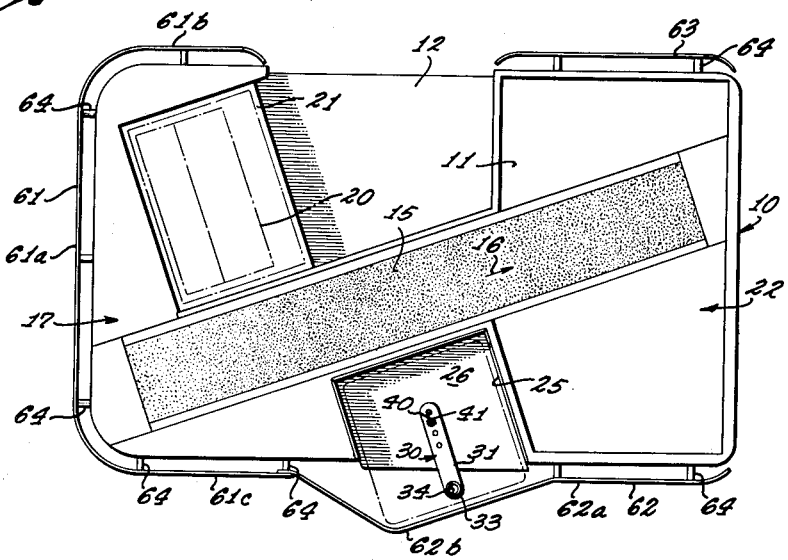
Fig. 1 is a plan view of a check stand showing the recessed supporting base for a weighing scale and the present scale supporting element for supporting the outer end of the scale.

Referring first to Fig. 1 of the drawings, the check stand 10 is herein shown as a cabinet-like structure of generally rectangular configuration having a top 11 provided with a cutaway niche, recess, or compartment 12 providing a recess in which the checker may be stationed. An endless conveyor belt 15 extends around suitable pulleys (not shown) beneath the top 11 and the upper portion of the belt is arranged substantially in the plane of the top 11. One of the pulleys is driven from an electric motor to cause the belt to travel in the direction of arrow 16. Such a check stand is described in more detail in my copending patent application Serial Number 244,525, now Patent No. 2,723,728.

In practice, purchased items are conveyed in a suitable cart to the unloading end or station of the check stand designated by the reference numeral 17 and the customer, or an attendant, places the articles upon the left-hand end of the conveyor belt 15. The articles thus are conveyed past the checker who tallies the prices of the items by means of a computing cash register 20 which, as indicated in Fig. 1, is conveniently supported upon a downwardly recessed shelf 21 at a side of the checker's compartment 12. After passing the checker's station 12, the purchased articles are conveyed to a loading station 22 at the other end of the check stand where they are placed in bags, boxes or other containers.

When the check stand is employed in a grocery store, various items, such as fruits and vegetables, must be weighed by the checker. For this reason, a scale is usually provided upon the top of the check stand, the scale being arranged at the side of the conveyor belt opposite the checker's station 12. In order to dispose the scale at a level which will permit convenient placing of the articles thereon and easy reading of the dials, the scale may be located within a depression or recess 25 formed in the top 11 at a side of the stand, the recess having a bottom wall or shelf 26 for supporting the scale.

In designing check stands, it is important that they be made as narrow as possible so as to accommodate a maximum number of the stands in a line in a predetermined space at the exit portion of the shopping area of the store. With this consideration in mind, it has been found advantageous to make the scale recess 25 of a length which wil accommodate a scale of the smaller type, and to provide additional supporting means by which the outer end of a larger scale, which may project laterally beyond the side of the check stand, can be adequately supported.

Figure 2:
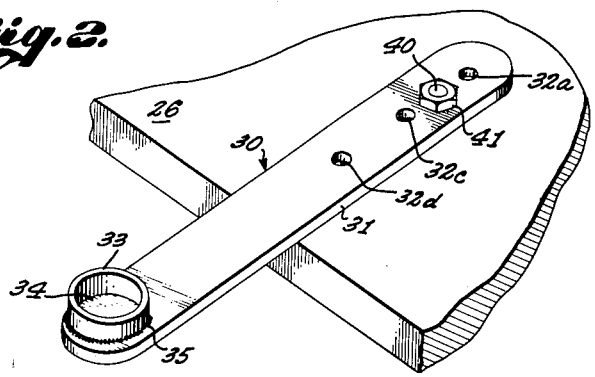
Fig. 2 is a perspective view of the scale mounting or supporting element, shown as secured to the recessed base of the check stand.

In the check stand shown in the drawings, the supporting device 30 includes an elongate bar or bracket 31 which has a series of longitudinally spaced apertures 32a, 32b, 32c, and 32d at one end. The other end of the bar 31 carries an annular, upwardly projecting boss 33, the interior of which provides a socket 34. The boss 33 may be cast integrally with the bar 31, or it may be welded thereto as indicated at 35 in Fig. 2.

Referring to Figs. 2, 4, 6 and 8, a securing bolt 40 extends upwardly through a hole in the floor 26 of the scale recess 25 with its head abutting the lower surface of the floor. The upper threaded end of the bolt 40 extends through one of the holes 32a, 32b, 32c or 32d of the bar 31 and receives a nut 41 which is tightened down against the bar to clamp the latter firmly against the floor 26.

Referring to Figs. 5 and 6, when a large size scale 50 is to be mounted on the check stand 10, the supporting element 31 is placed to cause the bolt to extend through the aperture 32a adjacent the end of the element. The outer socket end of the bar 31 thus is positioned at a considerable distance outwardly beyond the side of the check stand. The large scale 50 has depending feet in the form of vertically adjustable studs, it being common to provide two such feet or studs 51 at the front or platform end of the scale, and one such stud 51' at the rearward end of the scale. In installing the scale 50, the forward feet 51 are placed upon the floor 26 of the scale recess 25 and the outer or rearward foot 51' is caused to enter the socket 34 of the bar 31. By this means, the scale 50 has three-point support and thus is very stable. By adjusting the studs 51 and 51', the scale 50 may be readily leveled for accurate operation. Since the outer stud 51' is seated in the socket 34, lateral displacement of the scale is effectively resisted.

When a somewhat smaller scale 50' (Figs. 3 and 4) is to be installed, the supporting bar 31 is so placed that the securing bolt 40 extends through one of the intermediate holes such as hole 32b. By so locating the bar 31, its socket 34 is drawn inwardly to the position necessary to receive the outer foot 51' of the scale 50' of medium size.

When such a large or medium size scale is employed, a guard rail comprising sections 61, 62 and 63 is supported along a line spaced slightly from the check stand at about the level of the floor 26. The guard rail sections are all in the form of long resilient bar members and they are held in place by screws (not shown) passing through spacers 64. These guard rails protect the check stand from being struck by carts or by customers. Furthermore, the guard rails are provided with curved portions at all corners to minimize accidental injury to customers. Guard rail section 63 is at the rear of the checker's recess 12 on the side of the check stand near the sacking station 22 and is aligned with part 61b.

Figures 3, 4:
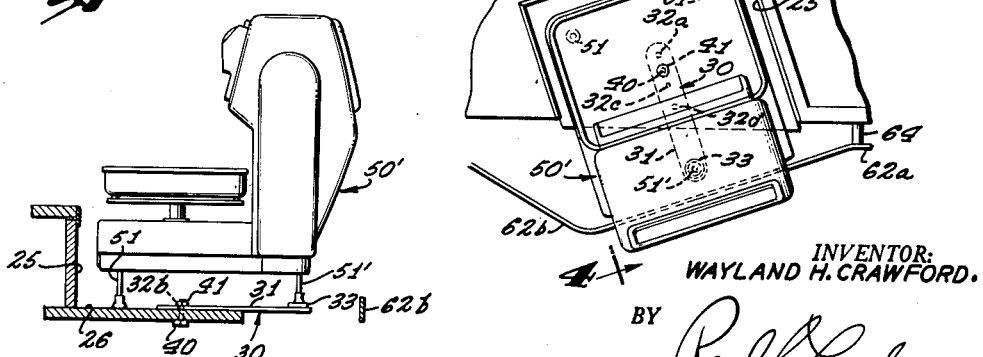
Fig. 3 is a plan view of a conventional scale showing it supported in part by the present supporting element.
Fig. 4 is a side elevational view of the same, as viewed in the direction of the arrows 4 in Fig. 3.

Section 61 is of U shape, part 61a standing at the front end of the check stand adjacent the unloading station 17 and other parts 61b and 61c lying adjacent the sides of the check stand at that end. The part 61c extends toward and terminates at a point near but in front of the shelf 26. As shown in Figs. 1, 3 and 5, section 62 comprises a rear part 62a aligned with part 61c and a front V-shaped part 62b which is bent outwardly from the check stand opposite the floor 26. The front end of the part 62b and the rear end of the part 61c are fastened together by means of one of the support screws. The projecting part 62b of the guard rail section 62 lies externally of the socket 34 and the base of the scale 50, thus preventing accidental striking of the scale or the supporting bar 31 by a grocery cart. The projecting V-shaped part 62b is formed with two arms that are inclined at acute angles somewhat less than about 45°, from the adjacent side of the check stand.

In Fig. 9 there is shown a series of check stands 10a, 10b and 10c laid out in side-by-side relationship to service a large number of customers. Here it will be noted that the passages 70a and 70b between adjacent check stands are not materially obstructed by projecting scales because the scale and the projecting part of the guard rails of each check stand lie opposite the niches 12 of the next adjacent check stand. However, it will also be noted that guard rails protect all of the most vulnerable parts of the check stands on the front thereof and also on the sides of the passages.

If, for any reason, a very small scale, such as that indicated as 50" in Figs. 7 and 8, is to be employed, the use of the supporting means 30 may be unnecessary. When this situation occurs, the nut 41 is loosened to release the supporting bar 31, after which the bar is pivoted inwardly to be disposed in its entirety upon the floor 26. The small scale 50" then is simply placed within the recess 25 to cause its three feet to rest directly upon the shelf 26, as shown.

When a small scale is employed as shown in Fig. 1, section 62' is straight and aligned with the section 61c and may even be an extension thereof, as indicated at Fig. 7. In this case, the supporting bar is completely retracted and no projecting guard rail part is needed to protect the scale. However, as before, the guard rails are located at all the most vulnerable parts of the check stand, that is those parts at the front and sides thereof.

It will be observed from the foregoing that my invention provides a simple, yet highly practical, means for supporting a weighing scale on a check stand where the scale is of a size requiring that it project laterally from the side of the stand. One important feature resides in the provision of a supporting element or bar that is adjustable relative to the check stand to adapt it to support the outer ends of scales of various sizes. Another important feature resides in the provision of a socket in the outer end of the supporting bar for receiving a foot of the scale so as to prevent unwarranted lateral displacement of the scale. Still another important feature resides in the employment of a guard rail having a projecting portion which protects the scale from injury.

Although my invention has been described with reference to one particular embodiment, it will be obvious that changes may be made in the material, form, details of construction and arrangement of the elements without departing from the spirit of the invention. It is therefore to be understood that my invention is not limited to the specific embodiment illustrated and described herein but that the invention encompasses all embodiments which fall within the scope of the appended claims.

I claim as my invention:

1. In a check stand having a straight side extending from one end thereof to the other end thereof and having a conveyor belt for carrying articles from a point adjacent said one end past a checking station to a point adjacent said other end, the improved supporting means for a weighing scale having depending feet at at least one end that comprises: a recessed shelf on the stand on the straight side thereof and opposite said checking station, said shelf having such a dimension transverse to said straight side that when the feet at said one end of the scale rest on said shelf with the scale located inwardly of said shelf the other, free end of the scale projects laterally beyond said side of the stand; and a supporting bar adjustably secured to said stand at about the level of said shelf to extend different selected distances laterally from said shelf and beyond said side of said check stand and in a direction away from said checking station in underlying relation to said other end of said weighing scale to support the same.

2. In a check stand having a straight side extending from one end thereof to the other end thereof and having a conveyor belt for carrying articles from a point adjacent said one end past a checking station to a point adjacent said other end, the improved supporting means for a weighing scale having depending feet at its ends that comprises: a recessed shelf on the stand on the straight side thereof and opposite said checking station, said shelf having such a dimension transverse to said straight side that the feet at one end only of the scale rest on said shelf with the other, free end of the scale, projecting laterally beyond said side of the stand; a securing bolt on said shelf; and a supporting bar having a plurality of longitudinally spaced apertures, each adapted to receive said bolt so as to clamp the bar in different positions of adjustment with its outer end projecting at different selected distances laterally beyond said shelf and said side of the stand to underlie said other, free end of the scale, said bar having a socket at its outer end receiving a said foot depending from said other end of the scale so as to support and resist lateral displacement of the same.

3. In a check stand having a straight side extending from one end thereof to the other end thereof and having a conveyor belt for carrying articles from a point adjacent said one end past a checking station to a point adjacent said other end, the improved supporting means for a weighing scale having depending feet at at least one end that comprises: a recessed shelf on the stand on the straight side thereof and opposite said checking station, said shelf having such a dimension transverse to said straight side that when the feet at said one end of the scale rest on said shelf with the scale located inwardly on said shelf the other, free end of the scale, projects laterally beyond said side of the stand; a supporting bar adjustably secured to said stand at about the level of said shelf to extend different distances laterally from said shelf and beyond said side of said check stand and in a direction away from said checking station in underlying relation to said other end of said weighing scale to support the same; and a guard rail supported on said stand, parts of said guard rail being mounted adjacent said straight side by means of laterally projecting support elements, and a separate removable part of said guard rail being mounted opposite said shelf and projecting outwardly from said straight side beyond the outer edge of said scale.

References Cited in the file of this patent

UNITED STATES PATENTS

| | | |
|---|---|---|
| 521,067 | Wood | June 5, 1894 |
| 1,212,514 | Lathrop | Jan. 16, 1917 |
| 1,720,876 | Anderson | July 16, 1929 |
| 2,210,972 | Christenson | Aug. 13, 1940 |
| 2,237,080 | Muse | Apr. 1, 1941 |
| 2,242,408 | Turnham | May 20, 1941 |
| 2,258,735 | Brancheau | Oct. 14, 1941 |
| 2,317,438 | Bradley | Apr. 27, 1943 |
| 2,413,164 | Boldt et al. | Dec. 24, 1946 |
| 2,631,689 | Rubaloff | Mar. 17, 1953 |

FOREIGN PATENTS

| | | |
|---|---|---|
| 285,119 | Great Britain | Feb. 6, 1928 |